United States Patent
Hwang et al.

(10) Patent No.: US 9,250,871 B2
(45) Date of Patent: Feb. 2, 2016

(54) METHOD AND APPARATUS FOR PROCESSING USER INTERFACE COMPOSED OF COMPONENT OBJECTS

(75) Inventors: Seo Young Hwang, Suwon-si (KR); Jae Yeon Song, Seoul (KR); Kyung Mo Park, Seoul (KR); Kook Heui Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 12/696,293

(22) Filed: Jan. 29, 2010

(65) Prior Publication Data

US 2010/0192078 A1 Jul. 29, 2010

(30) Foreign Application Priority Data

| Jan. 29, 2009 | (KR) | 10-2009-0007097 |
| Apr. 8, 2009 | (KR) | 10-2009-0030205 |
| Apr. 16, 2009 | (KR) | 10-2009-0033247 |

(51) Int. Cl.
*G06F 3/0481* (2013.01)
*G06F 9/44* (2006.01)

(52) U.S. Cl.
CPC .................................. *G06F 8/38* (2013.01)

(58) Field of Classification Search
USPC ........................................ 715/764, 746, 744
See application file for complete search history.

(56) References Cited

U.S. PATENT DOCUMENTS

| 5,777,621 A * | 7/1998 | Schneider et al. ............. 345/428 |
| 5,895,477 A * | 4/1999 | Orr et al. ....................... 715/202 |
| 5,956,738 A * | 9/1999 | Shirakawa ..................... 715/273 |
| 5,999,978 A * | 12/1999 | Angal et al. ................... 709/229 |
| 6,037,939 A * | 3/2000 | Kashiwagi et al. ............ 715/798 |
| 6,097,382 A * | 8/2000 | Rosen et al. ................... 715/762 |
| 6,232,974 B1 * | 5/2001 | Horvitz et al. ................. 345/419 |
| 6,343,377 B1 * | 1/2002 | Gessner et al. ................ 717/171 |
| 6,353,448 B1 * | 3/2002 | Scarborough et al. ......... 715/744 |
| 6,363,435 B1 * | 3/2002 | Fernando et al. .............. 719/318 |
| 6,446,136 B1 * | 9/2002 | Pohlmann et al. ............. 719/318 |

(Continued)

FOREIGN PATENT DOCUMENTS

| CN | 1842088 A | 10/2006 |
| CN | 101346973 A | 1/2009 |

(Continued)

OTHER PUBLICATIONS

J-C Dufourd et al: "An MPEG Standard for Rich Media Services", IEEE Multimedia, Oct. 1, 2005, pp. 60-62, XP008133091.

(Continued)

*Primary Examiner* — Phenuel Salomon
(74) *Attorney, Agent, or Firm* — Jefferson IP Law, LLP

(57) ABSTRACT

A method and apparatus for processing a rich media user interface composed of a plurality of component objects that is capable of transferring information from a group of component objects having a specific function but not supporting the export of information to a group of component objects importing information only through predetermined paths through unpredictable path are provided. The method for processing content composed of user interface component objects includes receiving content including a plurality of user interface component objects, extracting exportable information which is defined to be exportable outside the content, and transferring the extracted exportable information to a target object.

16 Claims, 8 Drawing Sheets

(56) References Cited

U.S. PATENT DOCUMENTS

| | | | |
|---|---|---|---|
| 7,234,111 B2* | 6/2007 | Chu et al. | 715/251 |
| 7,392,483 B2* | 6/2008 | Wong et al. | 715/746 |
| 2002/0059571 A1* | 5/2002 | Negishi et al. | 725/1 |
| 2002/0196268 A1* | 12/2002 | Wolff et al. | 345/718 |
| 2003/0011635 A1* | 1/2003 | Hasha et al. | 345/762 |
| 2003/0184585 A1* | 10/2003 | Lin et al. | 345/763 |
| 2003/0195896 A1* | 10/2003 | Suda et al. | 707/101 |
| 2004/0031058 A1* | 2/2004 | Reisman | 725/112 |
| 2005/0088436 A1* | 4/2005 | Swedberg et al. | 345/420 |
| 2006/0168526 A1* | 7/2006 | Stirbu | 715/740 |
| 2006/0227141 A1* | 10/2006 | Hogle | 345/473 |
| 2007/0174474 A1 | 7/2007 | Zhong et al. | |
| 2009/0049075 A1 | 2/2009 | Kim et al. | |
| 2009/0064002 A1* | 3/2009 | Katsumata et al. | 715/762 |
| 2009/0079735 A1 | 3/2009 | Dufourd et al. | |

FOREIGN PATENT DOCUMENTS

| | | |
|---|---|---|
| JP | 2001-306615 A | 11/2001 |
| KR | 10-2002-0085985 A | 11/2002 |
| KR | 10-2006-0106677 A | 10/2006 |
| KR | 10-2007-0098395 A | 10/2007 |
| KR | 10-2008-0074953 A | 8/2008 |
| WO | 2007/051784 A1 | 5/2007 |
| WO | 2007/054780 A2 | 5/2007 |
| WO | 2009/002109 A2 | 12/2008 |

OTHER PUBLICATIONS

International Organisation for Standardisation Organisation; Organisation Internationale De Normalisation; ISO/IEC JTC1/SC29/WG11; Coding of Moving Pictures and Audio; WD3.0 of ISO/IEC 14496-20 2nd Edition (1st Ed. + Cor + Amd.); Apr. 30, 2007, San Jose, CA.

* cited by examiner

METHOD AND APPARATUS FOR PROCESSING USER INTERFACE COMPOSED OF COMPONENT OBJECTS

PRIORITY

This application claims the benefit under 35 U.S.C. §119(a) of a Korean patent application filed on Jan. 29, 2009 in the Korean Intellectual Property Office and assigned Serial No. 10-2009-0007097, a Korean patent application filed on Apr. 8, 2009 in the Korean Intellectual Property Office and assigned Serial No. 10-2009-0030205, and a Korean patent application filed on Apr. 16, 2009 in the Korean Intellectual Property Office and assigned Serial No. 10-2009-0033247, the entire disclosure of each of which is hereby incorporated by reference.

BACKGROUND OF THE INVENTION

1. Field of the Invention

The present invention relates to user interfaces. More particularly, the present invention relates to a method and apparatus for processing a rich media user interface composed of a plurality of component objects that is capable of transferring information from a group of component objects having a specific function but not supporting the export of information to a group of component objects importing information only through predetermined paths through an unpredictable path.

2. Description of the Related Art

A user interface is a physical or virtual means implemented to provide interaction between a user and an object or system, such as machine or computer program, so that the user can input manipulation information for the system to output an execution result. Typically, the user interface is implemented as a system-specific application so as to operate in the system designated by the designer and is accordingly limited in configuration. Recently, the user interface has evolved from the static arrangement of the image and text buttons to a rich media content composed of various configurable media objects including text, audio, video, font, image, graphics, and the like. The Binary Format for Scene (BIFS) and the Lightweight Application Scene Representation (LASeR) are representative rich media standards. The LASeR is a recent rich media standard designed for representing and delivering rich media services using various multimedia elements such as scene description, video, audio, image, font, text, metadata, script, etc.

With the emergence of new services integrating diverse types of media including video, voice, and data, along with the diversification of terminals and services, a flexible and dynamic rich media interface, applicable to heterogeneous devices and even remote devices, beyond the concept of a device-specific functional interface is needed.

SUMMARY OF THE INVENTION

An aspect of the present invention is to address at least the above-mentioned problems and/or disadvantages and to provide at least the advantages described below. Accordingly, an aspect of the present invention is to provide a method and apparatus for processing a rich media user interface that is capable of processing information received through an unpredictable path along with the information provided through a predetermined path for a specific function or purpose.

Another aspect of the present invention is to provide a method and apparatus for processing a rich media user interface, composed of a plurality of passive and active component objects, that enables an active component object to bring the information of a passive component object through an unpredictable path and process the information along with information received through a predetermined path.

In accordance with an aspect of the present invention, a method for processing content composed of user interface component objects is provided. The method includes receiving a content including a plurality of user interface component objects, extracting exportable information which is defined to be exportable outside the content, and transferring the extracted exportable information to a target object.

In accordance with another aspect of the present invention, a method for processing content composed of user interface component objects is provided. The method includes receiving content composed of a plurality of user interface component objects, detecting information to be used as an input value to a target object among the information contained in the received content, and performing a function of the target object using the detected information.

In accordance with still another aspect of the present invention, an apparatus for processing content composed of a plurality of user interface component objects is provided. The apparatus includes a decoder for decoding the content composed of a plurality of user interface component objects, and an event processor for extracting information defined to be exportable outside the content and for exporting the extracted information to a target object.

In accordance with yet another aspect of the present invention, an apparatus for processing content composed of a plurality of user interface component objects is provided. The apparatus includes an event processor for detecting information that can be used as an input value of a target object among information contained in a received content, and for performing a function of the target object using the detected information as the input value of the target object.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'terminal' can be used to denote a device having a service content, a file, an application program, a group of objects, an object itself, and the like.

Although descriptions of exemplary embodiments of the present invention are directed to a Lightweight Application for Scene Representation (LASeR) engine as one of the known rich media engines, the present invention can be implemented with other rich media engines. Also, the operations of the LASeR engine that are described in the following descriptions can be performed by user interface management engines. In case that the rich media engine or the system is changed, the descriptions can be made with the terms and expressions used in the corresponding rich media engine or system.

Figure 1:
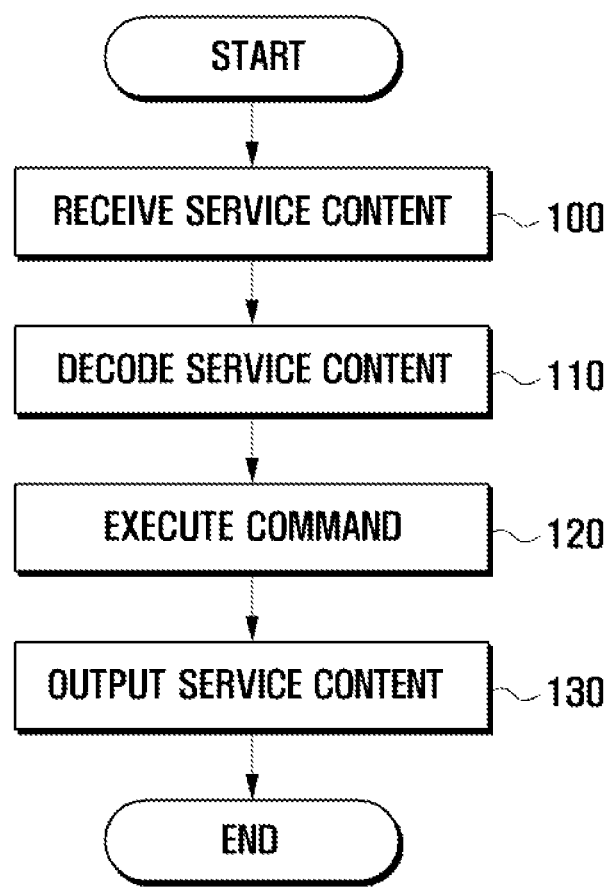
FIG. 1 is a flowchart illustrating a conventional procedure for processing a rich media user interface in a terminal.

FIG. 1 is a flowchart illustrating a conventional procedure for processing a rich media user interface in a terminal.

Referring to FIG. 1, the terminal first receives service content in step 100 and decodes the received service content in step 110. Next, the terminal composes the decoded service content in the format appropriate for the user interface by determining and executing commands and events in step 120. Consequently, the terminal renders the service content onto the user interface output means supporting video and audio output in step 130.

The LASeR content, as an example of the rich media service content, can be expressed in a syntax as illustrated in table 1.

TABLE 1

<NewScene>
<svg>
. . .
</svg>
<NewScene>

Referring to table 1, the LASeR content includes a NewScene command for instructing to draw a new scene. The terminal renders the scene <svg> . . . <svg> wrapped in the NewScene command onto the display. With the emergence of new services integrating diverse types of media including video, voice, and data, along with the diversification of terminals and services, a flexible and dynamic rich media interface applicable to heterogeneous devices and even remote devices beyond the concept of device-specific functional interface is needed. However, the conventional rich media user interface is limited in functionality to receiving information supplied through predetermined paths, thereby lacking in usability of foreign content and in the ability to work with other user interfaces.

Figure 2:
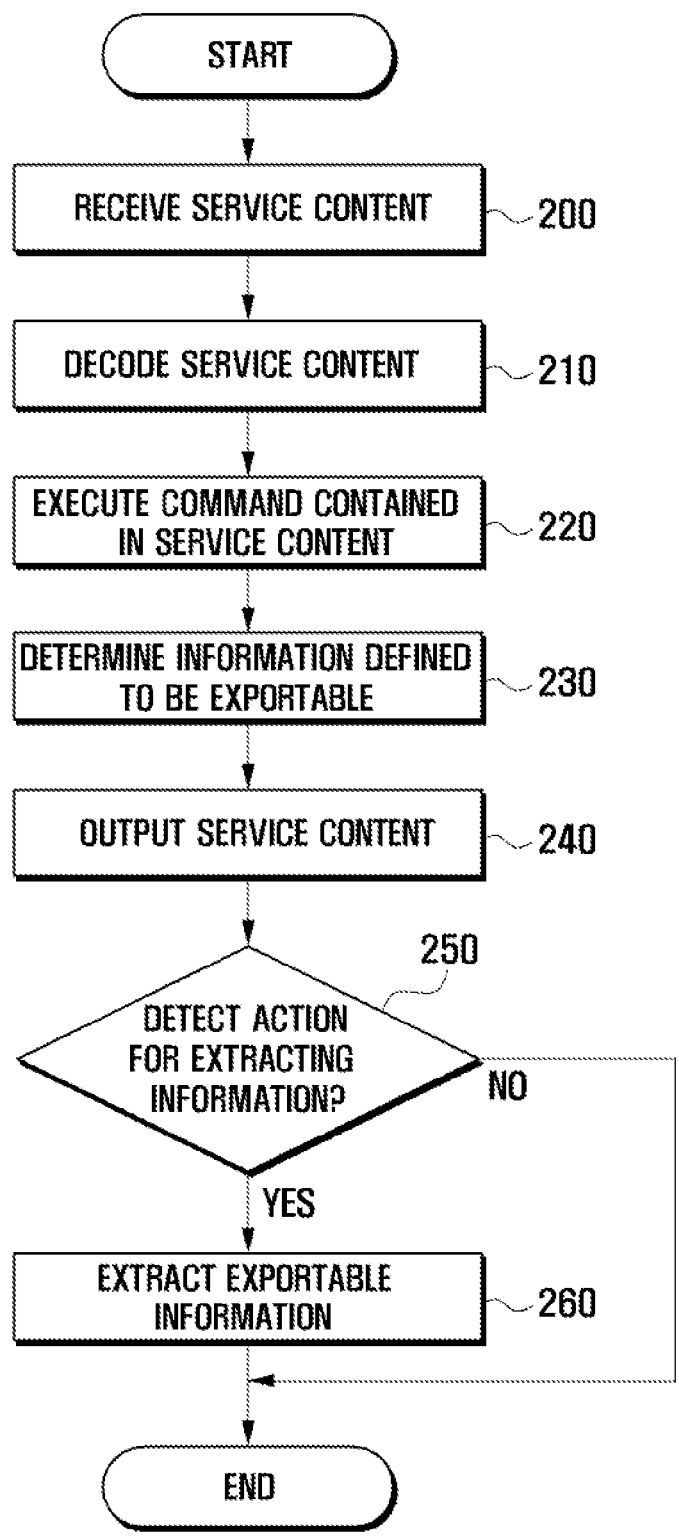
FIG. 2 is a flowchart illustrating a method for processing content composed of user interface component objects in a terminal according to an exemplary embodiment of the present invention.

FIG. 2 is a flowchart illustrating a method for processing content composed of user interface component objects in a terminal according to an exemplary embodiment of the present invention.

Referring to FIG. 2, the terminal receives service content in step 200 and decodes the received service content in step 210. The decoding process can be skipped when the service content has been transmitted without encoding. The terminal determines and executes the commands contained in the decoded service content in step 220. The commands express changes of a scene in a declarative manner. For example, the commands may include 'NewScene' to designate a new scene, 'Insert' to designate insertion of an element or attribute, 'Delete' to designate deletion of an element or attribute, and the like. The LASeR scene components include the elements, attributes of the elements, events, and scripts that express the media and graphical objects constituting a scene in the declarative manner.

In an exemplary embodiment of the present invention, a service content composed of the user interface component objects includes exportable information that can be used outside the content as well as non-exportable information that can be used only inside the content, and thus the terminal interprets and determines the exportable information elements of the user interface component objects in step 230. In this case, the terminal interprets and determines the media and graphic objects composing the user interface scene such as the elements, the attributes of individual elements, events, and scripts that are expressed in a declarative manner.

The terminal renders the service content composed as above onto a user interface means supporting video and audio outputs in step 240. Although not depicted in the drawing, all the events related to the LASeR service and content constituting the user interface can be executed prior to step 240.

While rendering the service content, the terminal monitors to detect an action or signal (e.g., event on the user interface) for extracting the exportable information elements in step 250. If it is determined that an exportable information extraction event has been detected, the terminal extracts the exportable information elements from the user interface component objects in step 260. The exportable information elements extracted from the user interface component objects can be handled by the LASeR engine, a specific module responsible for communication with external device, or a user interface management engine. Also, the extracted exportable information elements can be handled by means of an application related to communication with an external entity, Application Programming Interface (API), or a temporary memory of the system library of the terminal. On the other hand, if it is determined that an exportable information extraction event has not been detected, the terminal ends the exemplary method.

In another exemplary embodiment of the present invention, the exportable information elements extracted at step 260 can be exported to a destination terminal, application program, or content, depending on the action or signal detected at step 250. The user interface management engine can be called a user interface manager or widget manager (hereinafter, mainly called user interface manager). In the following descriptions, the user interface manager can be an extended function of the LASeR engine. The user interface manager can be integrated into the LASeR engine, implemented as a separated function module, and the like.

A description is made of an exemplary procedure at step 230 in which the terminal interprets and determines the exportable information elements included in the component elements of the service content and the action or signal as the exportable information extraction event monitored at step 250 of FIG. 2 hereinafter in more detail.

First Exemplary Embodiment

In a first exemplary embodiment of the present invention, how to create the exportable information elements contained in the component objects of the service content and how to render the scene along with these information elements are described in more detail.

The exportable information elements can be composed of element and attribute values, wherein the element is a basic unit constituting the objects of a scene, the attribute is a property of the corresponding element, and the attribute value is a specific value indicating a degree of the attribute. For instance, 'rect' denotes an element indicating a rectangle, 'width' is an attribute to define a property of the element 'rect', and '10' is a value indicating a degree of the 'width'. The information that can be input/output and exchanged with external entities can be expressed in different syntax formats with various fields and parameters of the fields in the same purpose and function.

Table 2 illustrates an exemplary content of the user interface including a new element and attribute for expressing the exportable information according to an exemplary embodiment of the present invention. Referring to table 2, the 'g' element, as a container element, includes the 'image' element. The 'g' element is a container element for grouping together related graphics elements. Accordingly, the 'g' element can group various scene component elements including graphics elements (such as 'rect' element for drawing a rectangle and 'circle' element for drawing a circle), text, audio, video, image, and the like.

The newly defined 'extract_enable' attribute can have 'true' value, which denotes that its child elements contain the exportable information. In case that the 'extract_enable' attribute has 'true' value, this can mean that it contains the exportable information. In the example of table 2, the 'image' element can be extracted. In this case, the exportable information can be the image file or the address of the image as the attribute value of 'href:type'. Here, the exportable informa-tion of the child elements can be predetermined. For instance, the image has the image address as its value, and the 'text' element has the 'textString' element value.

TABLE 2

```
<g extract_enable="true">
    <image href:type="image_URL">
</g>
```

Table 3 illustrates another exemplary content of the user interface including the exportable information. The attribute value of the element indicated by the attribute value of 'output' can be extracted as the exportable information. In table 3, the 'image' element has the address of the image element (output="href:type"), the 'rect' element has the 'color' attribute having the attribute value of 'red', and the 'text' element has the element value (textString (target"textCon-tent")) that are exportable. Also, the information of multiple attribute values, like 'output="color, x, y", can be extracted from an element using the 'output' attribute. Also, both the 'extract_enable' and 'output' can be used simultaneously to export the 'output' attribute of which 'extract_enable' attribute has the 'true' value.

TABLE 3

```
<g>
    <image href:type="image URL" output="href:type">
    <rect color="red" output="color"/>
    <text output="value"> textString </text>
</g>
```

Table 4 illustrates another exemplary content of the user interface including the exportable information. The 'commu-nication' element for expressing the exportable information indicates that the 'href:type' attribute value of the user inter-face component object of which 'ID' attribute value is 'img' can be extracted. In the example of table 4, the information can be included in the rich media scene configuration infor-mation of LASeR or formed as a data or a file separated from the scene component element.

TABLE 4

```
<communication type="output" targetID="img" targetValue="href:type"/>
```

As described with reference to tables 2 to 4, the data extracted, while exporting the exportable information, can further include the identification information of the object, data type of the object, location information, size informa-tion, and physical or logical category (e.g., name of the ele-ment or attribute and description about the object) in addition to the information extracted from the object. The extracted values can be the input values of the exportable information exchange process triggering condition and corresponding property recognition event.

Also, the data receiving the information that can be input from outside can be configured. For instance, the 'input' attribute or target node and target attribute as the target of the information can receive information from outside.

Although the "targetID" and "targetValue" in table 4 can be expressed with a single field to indicate use of the same information, if the target information is identical, any of the methods can be used. Although not described in detail with any example, any method that can extract the exportable parameters from a specific object belongs to the category of the present invention.

Figure 3:
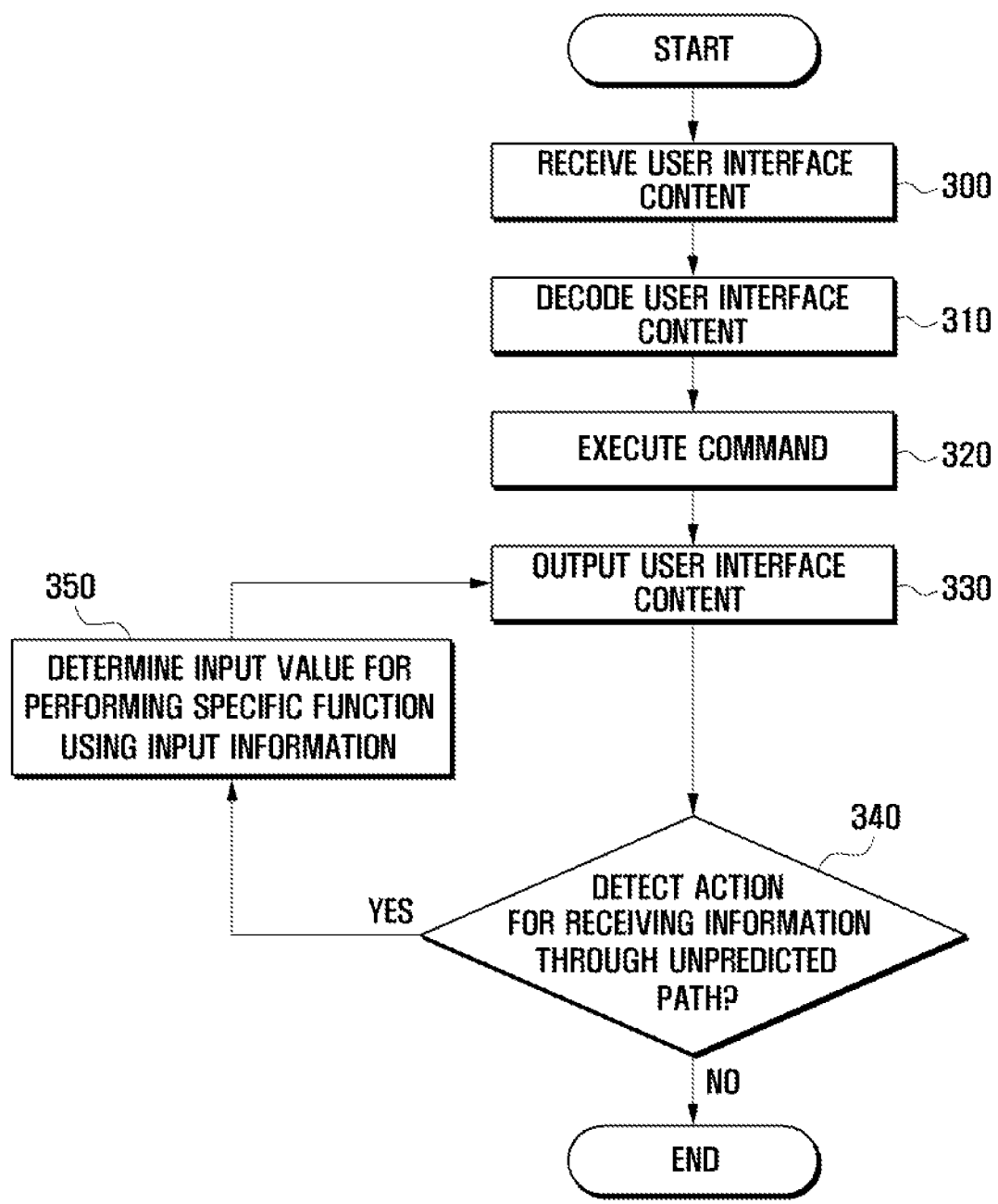
FIG. 3 is a flowchart illustrating a procedure for receiving information input through an unpredictable path in content composed of user interface component objects according to an exemplary embodiment of the present invention.

FIG. 3 is a flowchart illustrating a procedure for receiving the information input through an unpredictable path in the content composed of user interface component objects according to an exemplary embodiment of the present invention.

Referring to FIG. 3, the terminal receives a user interface content in step 300 and decodes the received user interface content in step 310. The decoding process can be skipped when the service content has been transmitted without encoding. The terminal determines and executes the commands contained in the decoded service content in step 320. The terminal outputs the content rendered by executing the command through a user interface means supporting video and/or audio in step 330.

Although not depicted in the drawing, the procedure can further include interpreting and processing the elements and attributes of each element, events, and scripts for presenting the media and graphics objects composing the LASeR scene prior to step 330. Although not depicted in the drawing, all the events related to the content composing the user interface can be executed prior to step 330.

While outputting the user interface content, the terminal monitors to detect an action or signal for receiving the information input through an unpredicted path other than the predetermined path in step 340. If the unpredicted path input action or signal has been detected, the terminal analyzes the information received through the unpredicted path and determines an input value for executing a specific function based on information such as the type of the received information, event, physical and logical category of the received information, and the like in step 350.

The terminal can perform various actions such as execution of a specific function or use of the information as the input value of a customized user interface according to the features of the component object. At this time, the terminal (as the receiver), group of recipient objects, or the object can determine whether the received information is available for its specific function. For instance, if the received information is the text information, the recipient object can recognize whether the text information is input to be executed with the function of the recipient object although it supports the data type of text. In case that the data type of the input text information is for executing a specific application program such as a player but the recipient object supports only the simple text content, the terminal (or the recipient object group or the recipient group) cannot use the received information as the input value of the recipient object. This function can be performed by the LASeR engine, the user interface manager, the terminal, the recipient object group, or the recipient object itself.

The recipient terminal, the recipient object group, or the recipient object which detects the receipt of the action or signal indicating the receipt of the information through an unpredicted path may not be in an active state but in an idle state or a standby state. Also, the terminal, recipient object group, or recipient object can be in a state of monitoring the external input. If an action or signal has been detected, the terminal, recipient object group, or the recipient object can switch to the active state or wait for a transition to the active state and process the information received in active state. Here, the information received from outside can be a specific attribute value or command or event for triggering the operation of a target object (node, field, attribute, command, or object group).

Second Exemplary Embodiment

In a second exemplary embodiment of the present invention, the action or signal for extracting the importable/exportable or exchangeable information contained in a group of user interface component objects (i.e., the user interface contents) are defined, and the importable/exportable information and importing/exporting procedure are described in detail.

The contents constituting a user interface can be processed with the events defined by the signals and actions related to the network session management, decoding, terminal status, and data or interface input/output, as events. If any of the events has been detected, the LASeR engine, terminal, or the user interface changes the scene or takes an action according to the detected event. An exemplary method of detecting the action or signal for extracting the exportable information and import/export or exchange of the extracted information with another content object or user interface is described hereinafter.

As an example of the event-driven user interface information transfer and exchange, the LASeR engine (or the terminal or the user interface manager) detects the event, which is newly introduced in an exemplary embodiment of the present invention, and executes the commands related to the detected event to process the functions, elements, and commands in association with the information import/export and exchange with an external object, another content, program, or terminal.

In order to transfer or exchange the information between the user interfaces or application programs, the LASeR engine or the user interface manager can transfer the functions for the content or application programs to detect the event triggering the information transfer and exchange. For instance, the LASeR engine or the user interface manager can provide and register the content, objects, or other terminal with a Listener that enables detecting the events triggering the information transfer and exchange. The add-in or registration of the Listener can be performed by means of unicast, multicast, or broadcast. The transfer and configuration of the Listener can be a method for notifying of the object triggering the event and the action linked to the event, and the event Listener can map the events with the corresponding actions known to both sides.

Table 5 illustrates descriptions of events related to the information export and import of the user interface component object and transfer and exchange of the information with another external content or user interface.

TABLE 5

| Event name | Namespace | Description |
| --- | --- | --- |
| move_out | Urn:mpeg:mpeg4:laser:2009 | This event occurs when the cursor of a pointing device moves out of the region of a scene component object. |
| move_in | Urn:mpeg:mpeg4:laser:2009 | This event occurs when the cursor of a pointing device moves into the region of a scene component object. |
| Widget_communication_typeA | Urn:mpeg:mpeg4:laser:2009 | This event occurs when a link or information exchange is established |

TABLE 5-continued

| Event name | Namespace | Description |
|---|---|---|
| | | externally to the user interface object through a predetermined action. |
| Widget_communication_typeB | Urn:mpeg:mpeg4:laser:2009 | This event occurs when a link or information exchange is established externally to the user interface object. |
| Widget_communication(A) | Urn:mpeg:mpeg4:laser:2009 | This event occurs when a link or information exchange is established externally to the user interface object through an input value A. |

In table 5, the 'move_out' event occurs when the cursor of the pointing device moves out of the region of the scene component object. Also, the 'move_out' event can be configured to occur when an action or a signal for extracting the exportable information is detected as described at step 250 of FIG. 2. In this case, if the export of the information has been detected, the LASeR engine, user interface manager, or terminal can transfer the Listener for the external object or another terminal supporting the information exchange by means of unicast, multicast, or broadcast.

The 'move_in' event occurs when the cursor of the pointing device moves into the region of the scene component object. Also, the 'move_in' event can be configured to occur when any information is received through an unpredicted path as described at step 340 of FIG. 3. In this case, the LASeR engine, user interface manager, or terminal can detect the action or signal related to the receipt of the information through the unpredicted path.

The 'widget_communication_typeA' event occurs when a link or information exchange is established with another user interface object, program, or terminal by a predetermined action. The action can be a set of behaviors (e.g., drag and drop behaviors). The action can be defined by the LASeR engine, the user interface manager, or the terminal to be recognized, and notified to the content, object or other terminal supporting the information exchange by means of unicast, multicast, or broadcast. Also, the 'widget_communication_typeA' event can be configured to occur when an action or signal for extracting the exportable information is detected as described at step 250 of FIG. 2 and when an action or signal is generated by the receipt of the information through an unpredicted path other than a predetermined path as described at step 340 of FIG. 3.

The 'widget_communication_typeB' event occurs when a link or information exchange is established with another user interface object. This includes the detection of the connection and information exchange between the two user interface objects. Like the 'widget_communication_typeA' event, the 'widget_communication_typeB' event can be configured to occur when an action or signal for extracting the exportable information is detected as described at step 250 of FIG. 2 and when an action or signal is generated by the receipt of the information through an unpredicted path other than the predetermined path as described at step 340 of FIG. 3. However, the 'widget_communication_typeB' event differs from the 'widget_communication_typeA' event in that it can detect the automatic update and information exchange between the LASeR objects according to the preset configuration.

The 'widget_communication(A)' event occurs when a link or information exchange is established with another user interface object by an input value (A). Also, the 'widget_communication(A)' event can be configured to occur when an action or signal for extracting the exportable information is detected as described at step 250 of FIG. 2 and when an action or signal is generated by the receipt of the information through an unpredicted path other than the predetermined path as described at step 340 of FIG. 3. Like the 'widget_communication_typeB' event, the 'widget_communication(A)' event can detect the automatic update and information exchange between the LASeR objects according to the preset configuration. However, the 'widget_communication(A)' event differs from the 'widget_communication_typeB' event in that it uses the input value A. For instance, the 'widget_communication(A)' event can trigger the establishment of a link and information exchange with another user interface object with the ID or URI identifying the external user interface object as the input value A. Also, the name of the event preset, name or ID of the user interface, input value of a specific device, function of script and program, and information or value indicating a function, for the information exchange between the user interface objects can be used as the input value A. At this time, the Listener for detecting the events can be registered with the corresponding object prior to the event detection. The variable as the input value 'A' can be represented by an absolute, a relative value, a value having a meaning and the like. The value having a meaning can be expressed symbolically to indicate a group or a set and denote the value preset internally/externally, and the value preset internally/externally can be determined by referencing the input value A. The variables can be expressed differently or have different values depending on the system. The input value can be a range of values, a value expressing quantity, or a variable indicating a specific value. The input value can be expressed as a set of values or a pair of values. The values of the set or pair may have different data types. The events defined in an exemplary embodiment of the present invention can be transferred through an interface for the event delivery. For instance, the 'widget_communication(A)' event recognized by a specific input value can be written or transferred in the form of an information field like 'input_eventTrigger=A' or 'output_eventTrigger=A'. If an event "A" is detected as 'input_eventTrigger=A' or 'output_eventTrigger=A' or an event occurs by "A", an action is taken in response to the event.

In the above exemplary embodiment, the LASeR engine, user interface manager, or terminal detects the action or signal generated by the extraction of the exportable information or the receipt of the information through unexpected path. If the export of the information has been detected, the LASeR engine, user interface manager, or the terminal transfers the information indicating the occurrence of the event to the target object by means of unicast, multicast, or broadcast. The transfer and configuration of the Listener can be a method for notifying of the object triggering the event and the action to be taken by the event, and the event Listener can map the events with the corresponding actions known to both sides. The information output or input through the interface can be defined in the scene component object as described in the first exemplary embodiment of the present invention or obtained by referencing any external information.

A description is made of an exemplary interface for detecting the action or signal to extract the exportable information and transferring and exchanging information with another external content or user interface based on the action or signal.

Table 6 illustrates a definition of the interface using an Interface Define Language (IDL). The IDL is a language that is used to define the interfaces and functions. The IDL is language-neutral and system-neutral so as be interpreted by different programs. Although the interface is defined using the IDL in an exemplary embodiment of the present invention, the definition of the interface can be expressed using various languages and presentation methods. The 'Communication' interface defined in table 6 can provide the information for the transfer and exchange of information with another external content or user interface as described with reference to table 5. Also, the 'Communication' interface can be used or referenced for detecting and processing the events and types of the event related to the information transfer and exchange with other contents or other external user interface. The attribute of the 'Communication' interface can be any of representing the information for referencing the user interface object and information on the information exchange and link between the user interfaces. For instance, the interface can be configured with the information such as the location of the user interface component information exportable or received by input, unique information such as ID of the information exportable or received by input, type of the extracted or received information, information indicating the attribute of the corresponding information or the physical or logical category containing the attribute of the corresponding information, whether to perform the information exchange in sync mode or not, callback in response to the information input/output request, and the like. The variable type of each attribute can be one of "float", "Boolean", "long", and "DOMString". However, the present invention is not limited thereto. For example, if there is a specific value for expressing the attributes of the interface, the attributes can be expressed using the variable types appropriate for the data attribute and function.

As aforementioned, the method for configuring and representing the interface can be changed depending on the system, terminal, and information presentation method. The attributes of the interface according to an exemplary embodiment of the present invention can be expressed in the form of elements, fields, or parameters depending on the information representation method. In case that the interface according to an exemplary embodiment of the present invention has a parent interface, the attributes of the mother interface can be inherited to defined the child interface.

TABLE 6

```
interface Communication {
    readonly attribute DOMString type;
    readonly attribute DOMString name;
    readonly attribute DOMString targetID;
    readonly attribute DOMString targetName;
    readonly attribute DOMString targetValue;
    readonly attribute DOMString dataType;
    readonly attribute DOMString eventName;
    readonly attribute DOMString eventinputValue;
    readonly attribute float target_x;
    readonly attribute float target_y;
    readonly attribute DOMString location;
    readonly attribute DOMString detail;
    readonly attribute Boolean async;
```

TABLE 6-continued

```
    readonly attribute Boolean callback;
    readonly attribute Boolean network;
    readonly attribute DOMString networkName;
    readonly attribute DOMString callbackValue;
}
```
No defined constants Attributes
type: This value indicates the type of the interface.
name: This value indicate the name of the interface.
targetID: This value indicates the id of the object to be output.
targetName: This value indicates the name of an output node or output attribute.
targetValue: This value indicates the output value.
dataType: This value indicates the data type of the output value.
eventName: This value indicates the event or command to be output or input.
eventinputValue: This value indicates the input value of the event to be output or input.
target x: This value indicates the x coordinate of the target object to be output.
target y: This value indicates the y coordinate of the target object to be output.
location: This value indicates the location of the target object to be output.
detail: This value contains description about the output value.
async: This value indicates whether the response to the output request is output in synchronous mode or asynchronous mode.
callback: This value indicates whether to perform the callback to the result of the output request.
callbackValue: This value indicates the information to be transferred by the callback as the result of the output or input request.
network: This value indicates whether to connect to an external network or not.
networkName: This value indicates the network name (protocol type).

In table 6, "type" indicates the type of the interface and can represent the attributes for the information input/output and the physical or logical category of the corresponding information. "Name" indicates the identifier or ID for identifying the interface. "Name" also can be used as the information for describing the operation to be executed by the interface. "TargetId" indicates the ID of the target object to be output or input. For instance, "targetId" can be used as the identifier of the target note or element. "TargetName" indicates the name of the target object to be output or input or the element or attribute of the target information, or the target object or input object. The individual information elements described in an exemplary embodiment of the present invention can be represented as a single field. For instance, "targetID" and "targetName" can be represented by "targetID.targetName". In the case of "circle.r", this represents the attribute "r" of the target node "circle".

"DataType" can be used to represent the property of the data or the functional property. The property of the data can be any of "string", "boolean", "decimal", "precisionDecimal", "float", "double", "duration", "dateTime", "time", "date", "gYearMonth", "gYear", "gMonthDay", "gDay", "gMonth", "hexBinary", "base64Binary", "anyURI", "QName", "NOTATION", "normalizedString", "token", "language", "NMTOKEN", "NMTOKENS", "Name", "NCName", "ID", "IDREF", "IDREFS", "ENTITY", "ENTITIES", "integer", "nonPositiveInteger", "negativeInteger", "long", "int", "short", "byte", "nonNegativeInteger", "unsignedLong", "unsignedInt", "unsignedShort", "unsignedByte", "positiveInteger", "yearMonthDuration", a data type such as an enumeration integer, character string, float, fixed float, unsigned float, and list that can be used in the corresponding rich media content, "mimeType" for identifying the application program and information, parameter type of the application program and program interface, type of variable or script parameter, variable type, and the like including combinations of any of the above.

"Target-x", "target_y", and "location" provide the information related to the location of the target output or input object. "Detail" can contain the description about the output or input value. "Async" indicates whether the reflection of the result of the output request is synchronous mode or asynchronous mode. In case that the information of which result reflection is set to synchronous mode is output or input, the result of the information exchange must be reflected immediately. Accordingly, when the user interface is in an idle state, the user interface is activated to reflect the result.

"Callback" indicates whether to perform the callback to the result of the output or input request. "CallbackValue" indicates the information to be transferred according to the execution of the call back to the result of the output or input request. For instance, the result of the operation for extracting the exportable information or receiving the information from outside is transferred to the object from which the information is extracted or received for determination. "Network" indicates whether to connect to an external network, and "NetworkName" indicates the name of the network or the type of the protocol.

"EventName" indicates the name of the event triggering the output or input. The event can be an event triggering a specific action of the target object (or field, attribute, or node). The event can be used as the command instructing the action of the target object and can be transferred outside. In case that the information is received through the input interface, the eventName='audio.activate' allows the target object of which name or ID is "audio" to trigger the "activate" event such that the action defined with the "activate" event is executed. That is, the event can trigger the action of the recipient object.

In case of transferring the event through an output interface, this means that the event can be delivered to the outside. It is possible to notify of the occurrence of the event to the outside or output an event triggering a specific action of the recipient object. At this time, the event-action mapping information can be provided to both the transmitting and recipient sides. For instance, an event triggering the action "activate" of the "video" object can be mapped to the command "play" to play the object "video". In an exemplary embodiment of the present invention, the procedure for mapping the event to the events with the actions or creating a mapping table containing the event-action mappings is provided.

Depending on the input or output action, multiple parameters or multiple events can be transferred simultaneously. For instance, the information elements for the "start", "phase", and "stop" can be transferred.

In case that the event requires an input value, the event can be transferred through an input value input/output interface using a new field "eventInputValue". As aforementioned, two or more fields can be integrated into a single field (e.g., "eventName.inputValue" field) for transferring the corresponding information.

When multiple output information elements exist, the information elements of the interface can be expressed with the information for the respective information elements. The attributes for expressing the output information can be represented by using a signal attribute having n paired values. Table 7 illustrates an exemplary interface having multiple output information elements.

TABLE 7

```
interface Communication {
    for(i=0; i<n; i++){
    readonly attribute DOMString type[i];
    ....
    readonly attribute DOMString networkName[i];
    }
}
```

As aforementioned, the information transferred through the interface described in an exemplary embodiment of the present invention can be expressed in various formats such as:

```
<communication type="..." name="..." targetID="..." targetName="..."
targetValue="..." dataType="..." async="..." callback="..." network="..."
networkName="..."/>
``` in declarative format of XML, and defined such as:

```
<communication type="..." >
    <output type="..." targetID="..." targetName="..."targetValue="..."
dataType="..." async="..." callback="..." network="..." networkName="..."/>
    <input type="..." targetID="..." targetName="..." targetValue="..." dataType="..."
async="..." callback="..." network="..." networkName="..."/>
</communication>
or
<communicationtype="..."network="..."networkName="...">
    <output type="..." targetID="..." targetName="..."targetValue="..."
dataType="..." async="..." callback="..."/>
    <input type="..." targetID="..." targetName="..." targetValue="..." dataType="..."
async="..." callback="..."/>
</communication>
    or
<communication io_type="output" name="..." targetID="..." targetName="..."
targetValue="..." dataType="..." async="..." callback="..." network="..."
networkName=" ..."/>
<communication io_type="input" name="..." targetID="..." targetName="..."
targetValue="..." dataType="..." async="..." callback="..." network="..."
networkName=" ..."/>
    or
<communication type="type" value="..."
type="name" value="..."
type="targetID" value="..."
    ...
/>
```

The information can be expressed in a format appropriate for the system regardless of the types of elements and attributes as long as the expression of the information meets the intended purpose.

Although the data transferred through the interface expressing the information elements are different from each other in form (i.e., expression), the information and purposes intended thereby are identical. Although not described with detailed syntax herein, the attribute and information about the values and data for the information exchange with the user interface object, file, or application program are included and, if the intended information and purpose transferred through the interface are identical, it can belong to an exemplary category of the present invention.

If the information described with the elements composing the interface of the present invention is included, it can belong to the category of the information transfer and exchange with another external content or another user interface by information output or input of the user interface component object according to an exemplary embodiment of the present invention. Although the interface for the information transferred to the outside and the detailed information thereof have been described with reference to table 6, the interface for the input information corresponding to the output information for exchanging the information with an outside object can be provided too. The interface can be implemented with separate output interface and input interface or an integrated single interface.

Table 8 illustrates an example for rendering a scene using the events defined above. For instance, if the 'widget_communication_typeA' event has occurred with the paired actions, the terminal exporting data to the outside or the terminal receiving the event listener detects the 'widget_communication_typeA' event and instructs the event processor to execute the action for outputting the information and the event processor of the recipient terminal receiving the data from outside to take an action for the input of information. The object instructed to take the action for outputting the information transfers the output information to the recipient object through the "output" interface, and the recipient object receives the input information through the "input" interface. These operations can be performed simultaneously or in series. In the latter case, the terminal transferring the data to the outside detects the event and sends the event listener, and then the recipient terminal receiving the data from the outside takes the next action. As illustrated in table 8, the input and output functions are called using a script. The information used in the functions can be the information input through the interface described in the second exemplary embodiment of the present invention.

TABLE 8

// terminal exporting data to the outside
<ev:listener handler='#output' event='widget_communication_typeA'/>
<script id='output'>
...
</script>
// terminal receiving data from the outside
<ev:listener handler='#input' event='widget_communication_typeA'/>
<script id=' input'>
...
</script>

Figure 4:
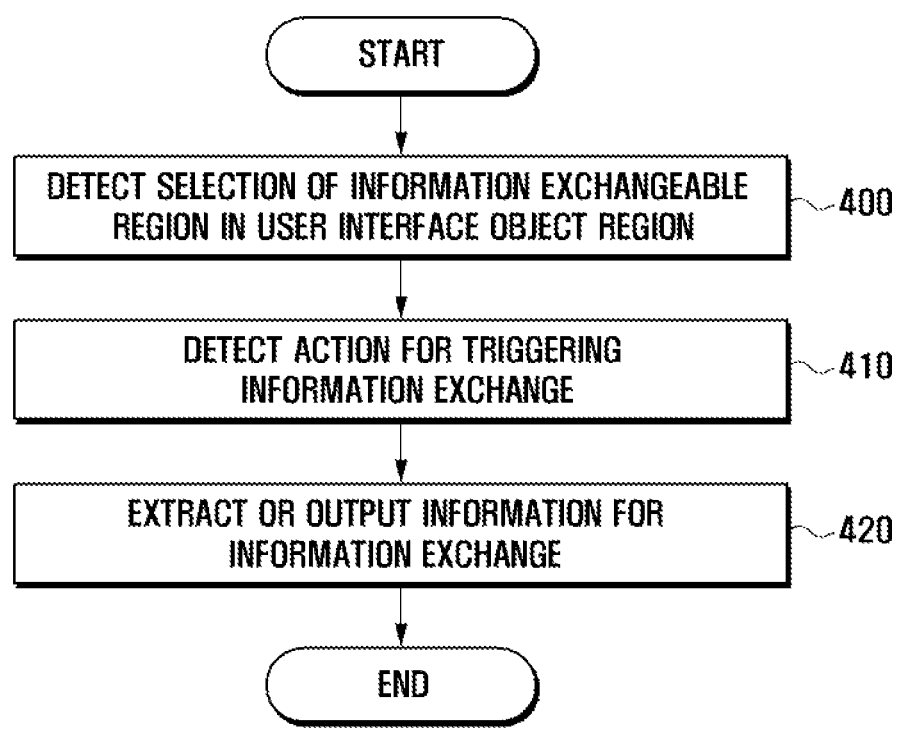
FIG. 4 is a flowchart illustrating a procedure for exporting exchangeable information of a user interface component object in a user interface control method according to an exemplary embodiment of the present invention.
Figure 5:
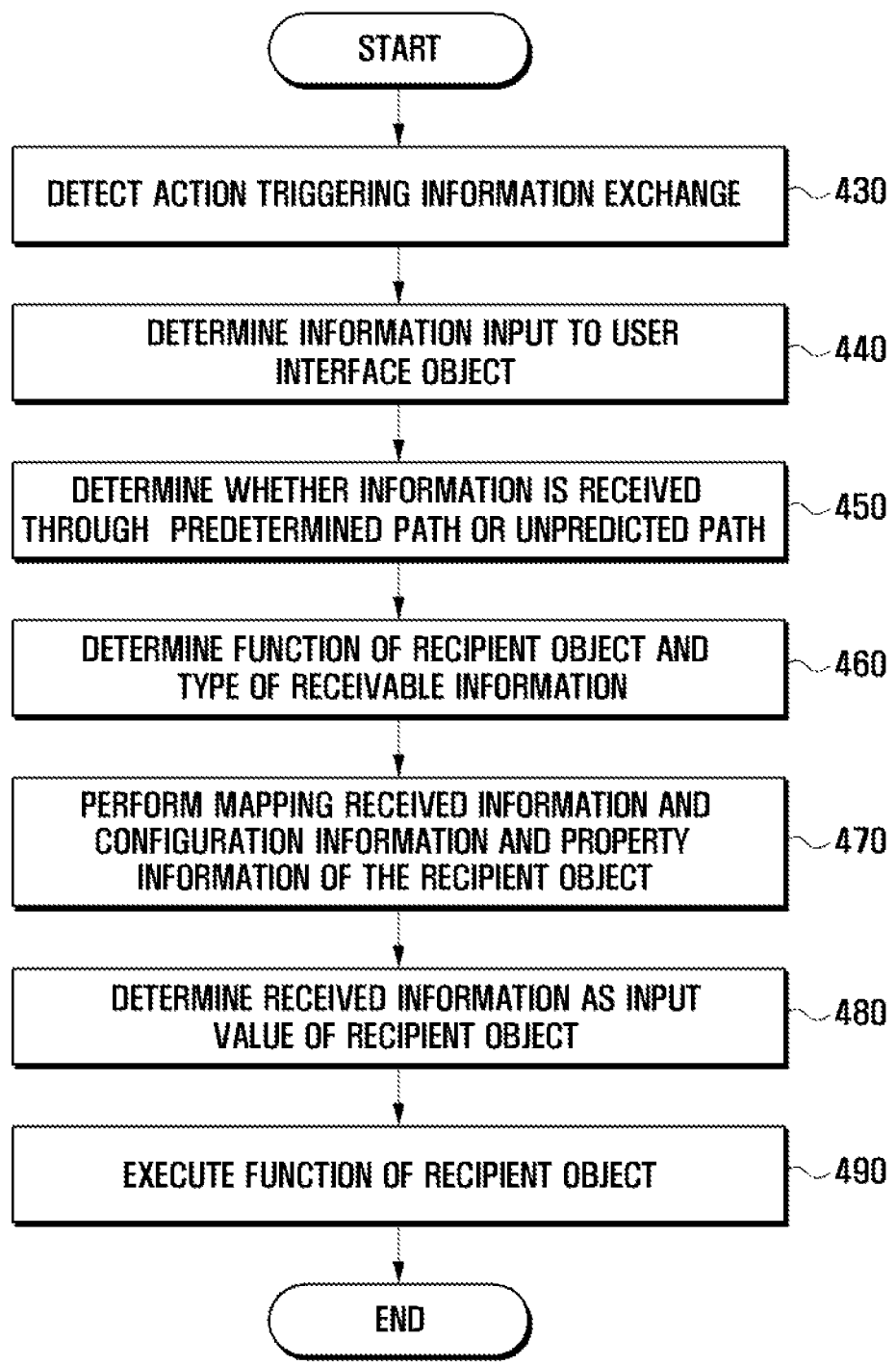
FIG. 5 is a flowchart illustrating a procedure for executing a function of a recipient object in a user interface control method according to an exemplary embodiment of the present invention.

FIG. 4 is a flowchart illustrating a procedure for exporting exchangeable information of a user interface component object in a user interface control method according to an exemplary embodiment of the present invention, and FIG. 5 is a flowchart illustrating a procedure for executing a function of a recipient object in a user interface control method according to an exemplary embodiment of the present invention. In the third exemplary embodiment of the present invention, a recipient object configured to perform its function with the information received through a predetermined path receives the information extracted or output from a group of objects (e.g., user interface component objects) configured to perform their own functions through unpredicted paths so as to perform information output or input by the user interface component object and perform information transfer and exchange with the other contents or user interfaces. FIGS. 4 and 5 illustrate exemplary procedures for the information exchange of the user interface object according to an exemplary embodiment of the present invention. However, the present invention is not limited to the exemplary information exchange and input/output procedures depicted in FIGS. 4 and 5.

Referring to FIG. 4, a procedure for information exchange in the user interface object outputting the information is illustrated. The LASeR engine, user interface manager, or terminal detects a selection of some or entire objects in a region of the user interface object in step 400. At this time, the object containing the information that can be transferred to the outside of the object (i.e., the exportable object) can be set to be in a selectable state. For instance, if a region is selected, the "focusable" attribute is set to "true", or a "focus in" event occurs.

If the selection of some or entire objects have been detected, the LASeR engine, user interface manager, or terminal detects a predetermined action for the information exchange in step 410. As aforementioned, the action can be detected in paired antecedent and subsequent actions, or in several actions and events that occur in sequential order to generate the command or event triggering the export or output of the information.

For instance, if a pointing action (mouse_down) is taken by means of a pointing device in the group of objects (i.e., the region of the user interface object) and then a moving action (mouse_move) is taken while maintaining the mouse_down state, the location of the cursor may move out of the region of the corresponding user interface object. The individual actions, having the respective meanings, must be taken in sequential order to be recognized as an action or event for information exchange with the outside so as to extract and export the information of the user interface object.

If the action triggering the information exchange has been detected, the LASeR engine, user interface manager, or terminal extracts or exports the information for the information exchange in step 420. In case that the export of the information is performed in the paired manner, the information export or path establishment action for the information exchange with the outside can be taken in the middle of the antecedent action or after the recognition of the command or event triggering the information exchange after the completion of the paired actions. The extracted or output information can be copied to the system library or stored in a temporary buffer of the manager which manages the group of the objects performing specific operations. If the information export has been detected, the LASeR engine, user interface manager, or terminal can transfer the information such as listener for the target content, target object, or target terminal to detect the occurrence of the events by means of unicast, multicast, or broadcast.

The process for transferring the information allowing detection of the event can be performed prior to the information input/output or in response to a predetermined action triggering the information exchange. The output information can be transferred through the interface as described in the second exemplary embodiment of the present invention.

FIG. 5 illustrates a procedure in which information received through an unpredicted path in the middle of information exchange with the outside of the user interface object is used as the input value for performing the function and operation of the recipient object.

The LASeR engine, user interface manager, or terminal detects the action predetermined for triggering information exchange in step 430. If the action predetermined for triggering information exchange has been detected, the LASeR engine, user interface manager, or terminal determines the information input to the user interface object in step 440.

The action predetermined for triggering information exchange at step 430 can be substantially identical with that described at step 410 of FIG. 4. As aforementioned, the action can be detected in paired antecedent and subsequent actions, or in several actions and events occurring in sequential order to generate the command or event triggering the export or output of the information. In case of paired actions, it is required to configure to determine that the antecedent action has occurred outside prior to the subsequent action. In case of the actions occurring sequentially, the terminal can detect the action predetermined for triggering the information exchange when the cursor of the pointing device moves in the region of the recipient object and the mouse-out action occurs at the pointing device.

If any information has been input at step 440, the LASeR engine, user interface manager, or terminal determines whether the information is input through a predetermined path or an unpredicted path in step 450. At this time, multiple information can be input. Next, the LASeR engine, user interface manager, or terminal determines the functions of the recipient object and the type of the information supported by the recipient object in step 460 and maps the input information with the supportable information of the recipient object in step 470.

The order of steps 460 and 470 can be changed. For instance, the LASeR engine, user interface manager, or terminal can determine the property of the input information and then determine the supportable information of the recipient object to map the input information with the supportable information. The mapping between the input information and the supportable information of the recipient object can be determined based on the physical or logical category of the input information or the type of the information to be transferred. In case that the attribute/node of the input information is identical with the attribute/node to be received, the input information can be recognized as the information that can be input to the corresponding node. In case that multiple information is input, the input information can be mapped through the aforementioned mapping process. The mapping process can be performed by referencing the function information of the input information. At this time, the mapping process can be performed by the terminal, user interface manager, or LASeR engine.

Once the received information is available as the input value for performing a specific function of the recipient object at step 470, the LASeR engine, user interface manager, or terminal determines the received information as the input value of the recipient object in step 480 and performs the function of the recipient object in step 490. For instance, in case that a text string is input to the recipient object having a search function, the terminal determines the input information is the text string other than the value of attribute or node and then performs search operation using the text string. Also, the terminal maps the color information extracted from an attribute titled "fill" to the "fill" attribute of an element responsible for the background of a recipient object so as to change the background color.

The predetermined action can transfer information with an action having directivity. For instance, any information of the user interface object can be extracted and transferred according to an action such as finger flipping in a specific direction on the screen and tilting the terminal relative to the gravity direction. If vector information is required for any action, the attributes for representing the vector information can be added to the user interface according to an exemplary embodiment of the present invention.

The event-driven information extraction and input of the user interface component object and information transfer and exchange operation with the outside content object or other user interface have been described with reference to FIGS. 4 and 5. However, the information exchange can be made with the LASeR object or other outside object automatically. In this case, the terminal and user interface manager determines the information about the other user interfaces, programs and terminals supporting the information exchange in advance and performs the input/output action for the information exchange according to the predetermined value or an input value without additional event.

For instance, the terminal can determine the information output by an object configured to output the information at a predetermined time and perform a predetermined action if the information on the node type, attribute name, and function of the output information are verified. The object configured to export the data continuously can export the corresponding data in a predetermined manner or exchange the information with an external object according to a value preset by the user. The object configured to import the data from outside can receive the information with a filter to gather only the information available as input information or receive the information according to the value preset by the user. The import operation can be performed by the object automatically or by the user configuration or object management module (e.g., the user interface manager).

Although the information exchange procedure has been described with an exemplary case of 1:1 information exchange, the present invention is not limited thereto. For instance, an exemplary information exchange procedure of the present invention can be applied for the 1:N, N:1, and N:N information exchanges.

An exemplary structure of an apparatus for extracting exportable information from the content composed of above-described user interface component objects and processing the information received through unpredicted path along with the information received through predetermined paths is described hereinafter.

Figure 6:
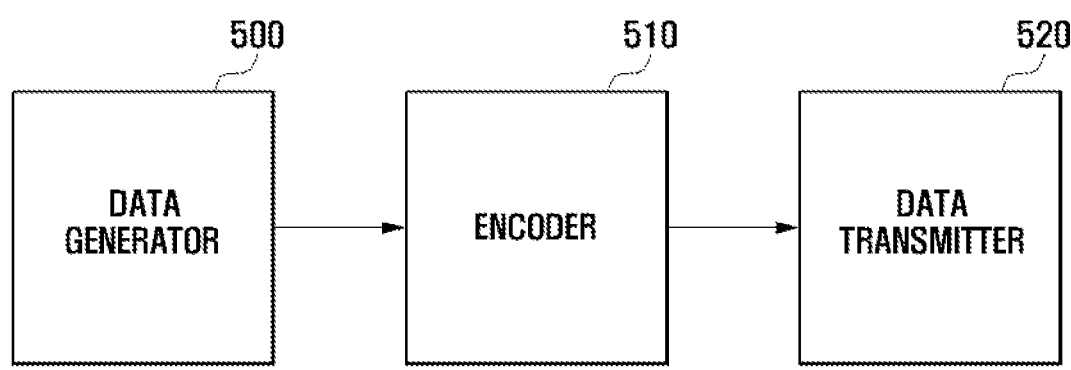
FIG. 6 is a block diagram illustrating a configuration of a transmission apparatus according to an exemplary embodiment of the present invention.

FIG. 6 is a block diagram illustrating a configuration of a transmission apparatus according to an exemplary embodiment of the present invention.

Referring to FIG. 6, the transmission apparatus according to an exemplary embodiment of the present invention includes a data generator 500, an encoder 510, and a data transmitter 520.

The data generator 500 generates content including content objects containing the user interface-related information including information that can be exported or transferred to the outside and events for information exchange with the outside and the user interface component objects.

The data generated by the data generator 500 are encoded by the encoder 510 and then output to the data transmitter 520 so as to be formatted in the format appropriated for the user interface content transmission and then transmitted to a recipient apparatus.

Figure 7:
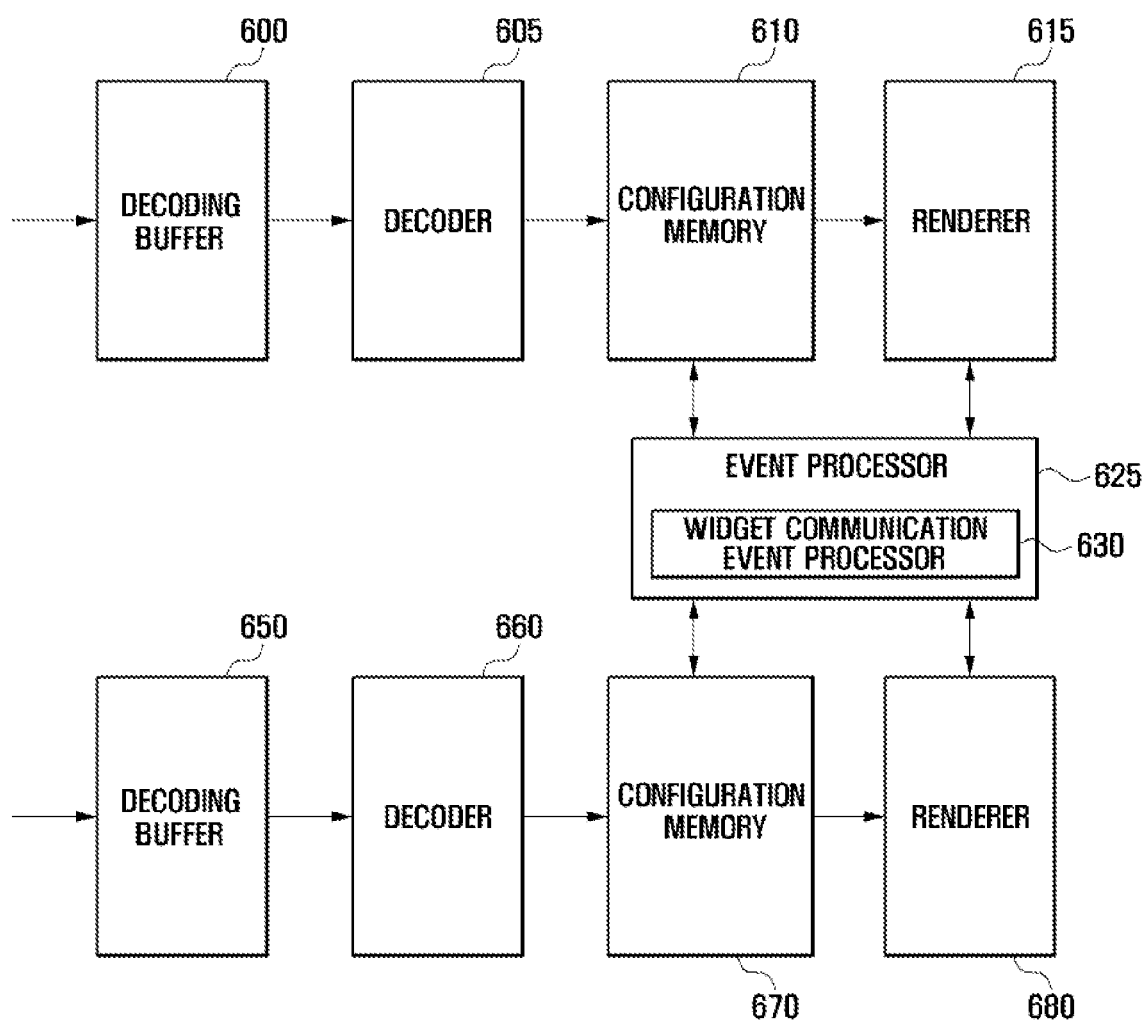
FIG. 7 is a block diagram illustrating a configuration of a recipient apparatus according to an exemplary embodiment of the present invention.

FIG. 7 is a block diagram illustrating a configuration of a recipient apparatus according to an exemplary embodiment of the present invention.

Referring to FIG. 7, the recipient apparatus includes decoding buffers 600 and 650, decoders 605 and 660, configuration memories 610 and 670, renderers 615 and 680 and an event processor 625. The event processor 625 includes a widget communication event processor 630.

The information defined in a specific format for transmission can be interpreted by an interpreter responsible for the interpretation of corresponding data in advance. Since the received user interface content can be composed of information elements created in different formats, the information elements are delivered to the different interpreters that can interpret the different types of information. The content composed of user interface component objects are buffered by the decoding buffers 600 and 650 and then output to the decoders 605 and 660. The decoders 605 and 660 decode the user interface component objects and output the decoded data to the configuration memories 610 and 670.

The configuration memories 610 and 670 can be the configuration memories of the user interface manager or the configuration memories of the user interface component object. Here, the configuration memory of the user interface component object can be the configuration memory of the LASeR engine. The configuration memory 610 and 670 determines whether there is any information/attribute/parameter defined to be exported to the outside and interprets and processes the commands and other scene component elements. The data interpreted and processed in the configuration memory 610 and 670 are used for managing the user interface in the user interface manager or output through the rendering process of the renders 615 and 680.

The event processor 625 including the widget communication event processor 630 detects the action or signal related to the information exchange on a path that is unpredictable. The action related to the information exchange of the user interface extracts the information or parameter defined to be exported to the outside and transfers the information or parameter to a recipient terminal, the target group including the user interface objects, or the target object.

The target terminal or object receiving the information elements through an unexpected path determines the information elements and extracts the input information from the information elements for performing its specific function. The method for determining the input information for use in the function can be changed depending on the information received through the interface, and the information determination process includes mapping the input/output information using the information received through the interface. The target terminal can use the extracted information (or data) for executing its function or as the input value of the user interface customized according to the features of the component objects. At this time, the recipient terminal, object group, or object can determine whether the received information is the information available for executing its specific function. This information determination process can be performed by the LASeR engine, user interface manager, recipient terminal, recipient object group, or the recipient object. The event processor 625 including the widget communication event processor 630 can be implemented as a separate module or integrated in the LASeR engine, terminal, or user interface manager.

Although the function blocks called configuration memories can be implemented with different names, they can be seen as the modules performing the same operations as the configuration memories in the rich media engine. For instance, the configuration memory can be a scene tree manager or a DOM tree configurator, and the event processor can be the user interface manager. In case that the transmitter transmits the information that is not encoded, the decoding process can be skipped. In an exemplary embodiment of the present invention, the object group or the object can include a component element of the user interface, an application program, a file, a user interface, or a widget.

Fourth Exemplary Embodiment

As described in the above exemplary embodiments of the present invention, the information exchange between user interface objects can be performed by the LASeR engine, user interface manager, or terminal. In a fourth exemplary embodiment of the present invention, the information export and import and information transfer and exchange with other external contents or user interface under the control of the user interface manager is described in more detail.

In an exemplary embodiment of the present invention, the user interface content can be formed in a single file format or composed of multiple content objects and information elements. For instance, the information about the component objects related to the scene of the user interface and the information to be determined by the user interface manager for managing the user interface while operating the user interface can be separately configured. The information about the component objects related to the scene is processed by the LASeR engine, and the information for the user interface management is processed by the user interface manager. That is, the information can be handled by different entities depending on the purpose. Also, the information related to the information exchange between the user interface component objects can be referenced by the LASeR engine and the user interface manager.

Figure 8:
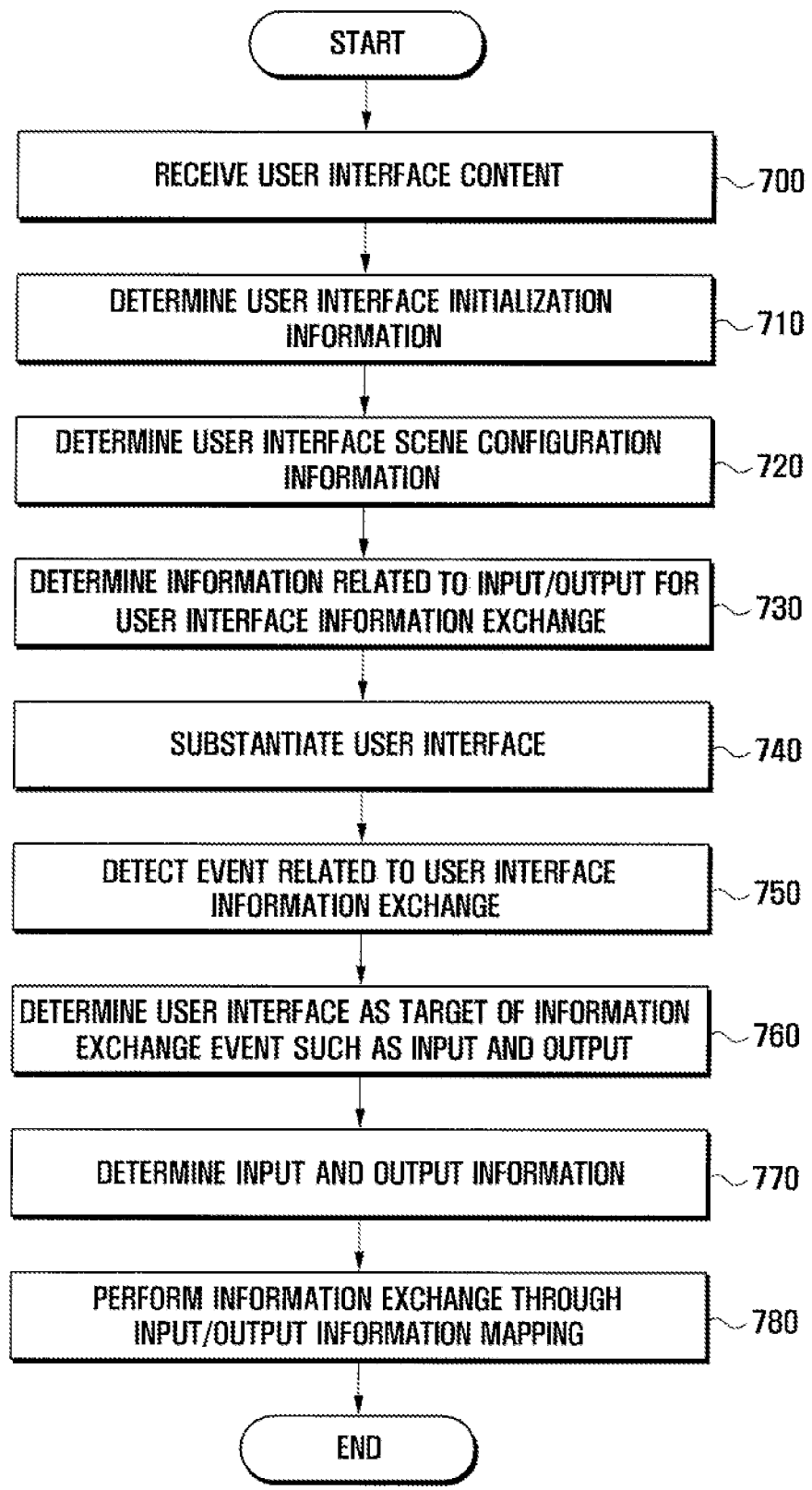
FIG. 8 is a flowchart illustrating a procedure for exchanging information between objects according to an exemplary embodiment of the present invention.

FIG. 8 is a flowchart illustrating a procedure for exchanging information between objects according to an exemplary embodiment of the present invention.

Referring to FIG. 8, the user interface manager receives user interface content in step 700. The received information can be a file or package containing the initialization information required for configuring the user interface or any information or file separately composed with the initialization information required for the initialization of the user interface. In case of receiving the file or package, it is required to analyze the file or package to determine the existence of the initialization information.

If the information has been received, the user interface manager determines the existence of the initialization information in step 710. Although the detailed operations can be changed depending on the terminal, the user interface initialization process includes steps of determining whether content can be interpreted by the user interface manager or the file or information are valid for the content related to the user interface, determining the configuration information for initialization of the user interface, and determining the information about the various component elements required for composing the user interface.

Once the initialization process has been completed, the user interface manager determines the user interface scene configuration information in step 720. The scene configuration information of the user interface denotes the scene configuration content in the multimedia/rich media format to be presented to the user. If the scene configuration information has been determined, the user interface manager configures the scene by means of a scene configuration engine such as a Hyper Text Markup Language (HTML) browser or a LASeR engine. The user interface manager can share information related to the scene configuration process and result with scene configuration engine (LASeR engine or HTML browser). The user interface manager also can receive such information from the scene configuration engine or monitor the operations of the scene configuration engine.

However, the scene configuration information determining process at step 720 may not include loading the actual content for configuring the scene on the memory. In any case, the user interface manager may only determine the location to receive the scene configuration content or the existence of the scene configuration content. In this case, the user interface configuration determining process of step 720 can be included as a part of the initialization process of step 710.

Once the scene configuration information has been determined by the scene configuration engine, the user interface manager determines the information related to the input/output for the user interface information exchange in step 730. The input/out information can be a part of the scene configuration content as described in the first exemplary embodiment of the present invention or the information provided in separation with the scene configuration content.

For instance, the input/output information can configured with the initialization information so as to be determined in the process for determining the initialization information or can be configured as separate information or file such that the scene configuration engine (such as LASeR engine) and the user interface manager can reference the separately configured information or file. Determining the input/output information for the user interface information exchange can be performed after the user interface scene information has been determined at step 720. Also, the user interface manager can determine and manage the input/output information and, if a related-event occurs or related information is requested while the user interface scene configuration content is loaded on the memory, the user interface manager can extract, transfer, or receive the actual information through the input/output interface. The information determined in the above manner is managed by the user interface manager. The input/output information can be the configuration information or function and property information of the user interface itself rather than the configuration information of the scene configuration object.

If there has been no input/output information in the received user interface, the user interface manager or the LASeR engine managing the scene configuration information determines that the user interface does not support the information exchanged with another external object. In case that the information input/output is configured to be activated without the input/output information, the user interface manager can determine the information exchange ability of the user interface with another external object using the information field or node containing the user interface initialization information, user interface composition information or configuration information, or information related to the scene configuration information.

Once all the information required for operating the user interface have been determined, the user interface is substantiated in step 740. It can be configured such that the user interface is substantiated after determining the individual component elements of the user interface with the initial information about the user interface, depending on the system or terminal. In this case, the user interface is substantiated after step 710, and determining the actual user interface scene configuration information can be performed while operating the user interface. If the substantiated user interface comes under the management of the user interface manager, the user interface manager can monitor the occurrence of the events related to the user interface information exchange according to an exemplary embodiment of the present invention.

The user interface manager manages the substantiated user interface in order to detect the event related to the user interface information exchange according to an exemplary embodiment of the present invention. While managing the user interface, the user interface manager can perform the following operations:

i) determining the user interface list managed by the user interface manager,
ii) determining user interfaces having the information importable and exportable among the user interfaces in the list,
iii) configuring the function to detect events such as action and signal related to the import and export of the information in the user interface having the importable and exportable information (e.g. the event of registration of the event listener that enables detecting the information exchange by the user interface manager),
iv) determining the name or type of the event or export/import information that allows identifying the event such as action and signal for the import and export information, and
v) determining the actual configuration information that can be imported and exported.

However, it is not required that all the processes must be performed for the user interface information exchange and by the user interface manager.

If an event related to the user interface information exchange (i.e., a request for the user information exchange) has been detected by the user interface manager in step 750, the user interface manager determines the user interface as a target of the information exchange event such as import and export in step 760. In case that the information exchange between the user interfaces listed in the list managed by the user interface manager is requested (i.e., the information exchange event is detected), the user interface manager determines the import and export information in step 770 and performs the information exchange by mapping the import and export information in step 780.

The mapping process is a process for searching for the information that can be paired for the information exchange and pairing the import and export information to exchange the information. The mapping process can be performed when the user interface manager detects the information exchange request or according to a preset configuration. In the mapping process, the user interface manager can map the information input through the interfaces categorized into the same type or same category, perform the import/export between the information exchange events having the same name, or map the information by determining the types and properties of the importable and exportable information of the user interfaces as the targets of the information exchange.

The type of the interface, which is determined for the information mapping, can be identified by the device type, import/export data type, or service type. Table 9 illustrates the available interface types.

TABLE 9

| interfaceTypeValue_inout | interfaceType_inout |
|---|---|
| 0x01 | Device type |
| 0x02 | Media type |
| 0x03 | Data type |
| 0x04 | Service type |
| 0x05 | Reserved |

The device type includes the information on the feature, capability, and function of a device and the information about the device type can be obtained by referencing the information provided in or out of the device. In case that the configuration, transmission, and function of the device and the data type of the device exists, the information can be used as the type of the interface. For instance, when "audio" data is received from "A" user interface through "UPnP AVtransport", the information can be mapped to the user interface having the interface information in which the type or name of the interface is "UPnP AVtransport".

The media type provides the information on the media such as text, video, image, audio, and font and can be identified by the extension, codec, "mimeType, or application program related to the media.

The data type can be any of various data types that can be used for the corresponding rich media content such as "string", "boolean", "decimal", "precisionDecimal", "float", "double", "duration", "dateTime", "time", "date", "gYearMonth", "gYear", "gMonthDay", "gDay", "gMonth", "hexBinary", "base64Binary", "anyURI", "QName", "NOTATION", "normalizedString", "token", "language", "NMTOKEN", "NMTOKENS", "Name", "NCName", "ID", "IDREF", "IDREFS", "ENTITY", "ENTITIES", "integer", "nonPositiveInteger", "negativeInteger", "long", "int", "short", "byte", "nonNegativeInteger", "unsignedLong", "unsignedInt", "unsignedShort", "unsignedByte", "positiveInteger", "yearMonthDuration", enumerate integer, character string, enumeration integer, character string, float, fixed float, unsigned float, list, and the like as well as any combination of the above.

Also, the data type can be identified by the information patterned according to the property of the information. For instance, the patterned information such as phone number, color expression, length expression, unit expression, and expression of vector information or position information can be used as type of the interface.

The service type allows the type of the interface to be identified by the information on the service such as game, banking, multimedia, tool, and system according to the features or functions of the provided user interface. The service type can be provided as semantic information or by referencing the ontology information or represented by hierarchical information based on the service classes.

Also, the interface type may reference the internal or external information of the terminal or service.

Also, the interface type may have a hierarchical structure of the interface types as described above and can be composed of more than one type according to the their correlation. For instance, the interface type of the interface for the information that can be transferred by an image view can be set to "print" depending on the device, "print" or "save" depending on the function, "img/jpg or img/png" in "mimeType" depending on the receivable media type, and "anyURI" depending on the data type. Each interface type can be formed in hierarchical structure and configured in the form having additional information.

If the target of the information to be imported or exported does not exist in the interface list that can be determined by the user interface manager, and if multiple import and export information is exchanged, the information exchange can be performed by determining the interface type. If there is no information mapped through the interface type, the mapping can be performed through the interface that can process the corresponding information using the type, name, and property of the information transferred through actual input/output. For instance, it is possible to map the information to the object having the same "targetValue" or same "contentType. For instance, if "audio" data is received from the "A" user interface through "UPnP AVtransport" but the user interface does not determine the interface having the type or name of "UPnP AVtransport" from the user interface for the input "A", it can determine the content type information or codec information of the received "audio data" and receive the corresponding information through the interface that can process the corresponding information.

Although not described in detail, the user interface can perform the mapping process for the information exchange using the name of the interface type or name of the input/output information and the input/output information of the corresponding user interface. The above description is applicable to all other embodiments of the present invention.

The interface type "interfaceTypeValue" for information input/output can be further included. For instance, if the device type is "Printer" (1), "Display" (2), and "MusicPlayer" (3) and interfaceType_inout="0x01", interfaceTypeValue_inout="1", this means that the type of the output or input device of the widget is "Printer". Multiple attributes can be used with interfaceType_inout="0x01 0x02", interfaceTypeValue_inout="12". Also, two pieces of information can be expressed using a single field such as interfaceType_inout="0x011". Also, the information can be managed with an index that is referenced for the corresponding information. For instance, the interfaceType_inout="0x01" and the interfaceTypeValue_inout="1" can be managed with the information having its ID "widgetComm01" and the interface types can be identified by referencing the corresponding information ID "widgetComm01".

As described above, the information can be included in the scene, used as specific attributes of the scene component elements, configured in the form of fields of the interface described with reference to table 6, and configured as separate information providing information related to the input/output interface. Also, the information can be provided in the form of an element or attribute. If the purpose of the information relate to the input/output interface, the information can be expressed in all available formats.

Fifth Exemplary Embodiment

In a fifth exemplary embodiment of the present invention, a description is made of the information related to the method for processing the information received by the user interface and updating the user interface. The user interface can perform the process of received information and the update of the user interface whenever the update data or the information for information exchange is received or at a predetermined update interval. These can be called synchronous and asynchronous information exchange and update. This information can be included in the user interface configuration information or composition information, user interface scene configuration information, or update data. Also, this information can be included in the configuration information for the input/output information that is transferred through the interface.

For instance, if it is configured to determine this information at step 710 of FIG. 8 in the fourth exemplary embodiment (i.e., if this information is included in the initialization information), the user interface manager determines this information and reflects the result of the information exchange in the terminal mapped to the input/output information at step 780 in sync mode or async mode depending on the data. If this information is set to the synchronous mode and the recipient terminal detecting the action or signal related to the user interface information exchange is in active state, the mapping result of the input/output information is applied to the user interface immediately. For instance, the scene can be updated with the execution of "refresh" action.

If the user interface as a target of the information input/output has been set in synchronous mode but is not in an active state, it is possible to transition the state of the user interface to the active state forcibly so as to receive or transfer the input/output information, thereby applying the information to the user interface.

If the user interface has been set in asynchronous mode, the recipient terminal detecting the action or signal related to the user interface information exchange performs updating, applying the information exchange result, or actually exchanging the information at the time when the update is performed through the predetermined action or function of the user interface at step 780 of FIG. 8 although the user interface is in an active state. In case that the user interface is not in an active state, the recipient terminal manages the corresponding information until the user interface enters the active state, and applies the information and exchanges the information when the state of the user interface transitions to the active state.

As aforementioned, the information related to the synchronous/asynchronous information can be included in the information transferred through the interface, the import/export information of the scene component object, or the configuration information of the user interface. Also, the information related to the synchronous/asynchronous mode of the user interface and the information about the synchronous/asynchronous mode of the input/output information to be exchanged can be set individually, and the result of the information exchange can be reflected differently depending on the priority of the configuration information. For instance, if the information updater of the user interface and the input/output information to be exchanged are configured in asynchronous mode and synchronous mode respectively and if the input/output information to be exchanged has the higher priority, the result of the information exchange is reflected in synchronous mode. The synchronous/asynchronous information can be configured by the user.

Accordingly, the information on the synchronous/asynchronous mode information, the configuration information on the synchronous/asynchronous mode, the priority information on the synchronous/asynchronous mode, the user configuration possibility information on the synchronous/asynchronous mode, and the forcible user interface activation probability information on the synchronous/asynchronous mode can be further included.

In the above described exemplary embodiments, if the node, field, element, attribute, and attribute value have the same meaning, the node, field, element, attribute, and attribute value can be named or defined by anything possible.

The information used as the node, field, element, attribute, and attribute value that are newly defined in exemplary embodiments of the present invention can be used by referencing the internal/external data, files, application programs, and services of a declarative description language-based program execution engine and the LASeR engine. Here, the attribute can be defined in the program execution engine and the LASeR engine such that only the attribute value is referenced and the attribute itself defined as other data, file, application program, and service can be referenced using the element and attributer having the reference function. Even when referencing the attribute and attribute value by using the element and attribute having the reference function, if it is used for the same purpose as the function of the attribute described in exemplary embodiments of the present invention, it is considered to be included in the category of the present invention.

As described above, an exemplary method and apparatus for processing a rich media user interface according to the present invention enables content composed of user interface component objects to export specific data to an external object, perform its own specific function by processing the information received through unpredicted path along with the information through a predetermined path, and use the information processed together for other purposes such that the information can be freely exchanged between the content objects and user interfaces, resulting in improvement of richness and usability of the user interface.

While the invention has been shown and described with reference to certain exemplary embodiments thereof, it will be understood by those skilled in the art that various changes in form and details may be made therein without departing from the spirit and scope of the invention, as defined in the appended claims and their equivalents.

What is claimed is:

1. A method for processing content composed of user interface component objects, the method comprising:
   receiving content including (i) a plurality of user interface component objects including exportable information and non-exportable information and (ii) indication information indicating which information of the user interface component objects is exportable;
   executing the received content including the user interface component objects and the indication information;
   identifying which information of the user interface component objects is exportable to outside the content, based on a predetermined action for information exchange to a target object;
   extracting the determined exportable information from the received content based on the indication information; and
   transferring the extracted exportable information to the target object through a path unpredicted by the target object.

2. The method of claim 1, wherein the transferring of the extracted information comprises:
   detecting at least one of an action and a signal for transferring the exportable information; and
   transferring the exportable information to the target object according to the at least one of the action and the signal.

3. The method of claim 1, further comprising:
   interpreting a command contained in the content; and
   rendering a user interface component object included in the content according to the command.

4. The method of claim 3, wherein the extracting of the exportable information and the transferring of the exportable information to a target object is performed during the rendering of the user interface component object.

5. A method for processing content composed of user interface component objects, the method comprising:
   receiving a plurality of pieces of information included in an content composed of a plurality of user interface component objects through an unpredicted path, wherein the plurality of pieces of received information comprises exportable information extracted based on indication information indicating which information of the user interface component objects is exportable based on a predetermined action for information exchange to a target object;
   detecting, from among the pieces of received information, a piece of information comprising an input value to the target object by mapping the pieces of received information with supportable information of an executed target object; and
   performing a function of the target object using the detected piece of information,
   wherein the detecting of the piece of information comprising the input value comprises determining the piece of information as the input value to the target object based on a name of the piece of received information indicating that the piece of information comprises the input value.

6. The method of claim 5, wherein the receiving of the plurality of pieces of information included in the executed content composed of a plurality of user interface component objects comprises:
detecting at least one of an action and a signal for triggering information exchange; and
receiving the plurality of pieces of information based on the at least one of the action and the signal for triggering information exchange.

7. The method of claim 5, further comprising:
extracting a function of the target object corresponding to the detected piece of information, wherein the performing of the function of the target object comprises executing the extracted function of the target object.

8. The method of claim 5, wherein the performing of the function of the target object comprises executing the function of the target object using the piece of information as the input value with the name of the piece of information.

9. An apparatus for processing content composed of a plurality of user interface component objects, the apparatus comprising:
a decoder configured to decode content composed of (i) a plurality of user interface component objects including exportable information and non-exportable information and (ii) indication information indicating which information of the user interface component objects is exportable; and
a controller including a processor configured to:
execute the decoded content including the plurality of user interface component objects and the indication information,
identify which information of the interface component objects is exportable to outside the content based on a predetermined action for information exchange to a target object,
extract the determined exportable information from the decoded content based on the indication information, and
transfer the extracted information to the target object through a path unpredicted by the target object.

10. The apparatus of claim 9, wherein the controller detects at least one of an action and a signal for transferring the exportable information and transfers the extracted exportable information to the target object.

11. The apparatus of claim 9, wherein the controller interprets a command contained in the content, the apparatus further comprises
a renderer configured to render a user interface component object included in the content according to the command.

12. The apparatus of claim 11, wherein the controller extracts the exportable information from the content and transfers the extracted information to the target object while the renderer is rendering the user interface component object.

13. An apparatus for processing content composed of a plurality of user interface component objects, the apparatus comprising:
a controller including a processor configured to:
receive a plurality of pieces of received information included in an content composed of a plurality of user interface component objects through an unpredicted path, wherein the plurality of pieces of received information comprises exportable information extracted based on indication information indicating which information of the user interface component objects is exportable based on a predetermined action for information exchange to a target object,
detect, from among the pieces of received information, a piece of information comprising an input value of the target object, and
perform a function of the target object using the detected piece of information as the input value of the target object,
wherein the controller determines the piece of information as the input value to the target object based on a name of the piece of received information contained in the content indicating that the piece of information comprises the input value.

14. The apparatus of claim 13, wherein the controller detects at least one of an action and a signal for triggering information exchange and receives the plurality of pieces of information included in the content.

15. The apparatus of claim 13, wherein the controller extracts the function of the target object which corresponds to the detected piece of information and performs the function of the target object.

16. The apparatus of claim 13, wherein the controller uses the piece of information contained in the content as the input value with the name of the piece of information.

* * * * *